United States Patent
Tang

(10) Patent No.: US 8,189,625 B2
(45) Date of Patent: May 29, 2012

(54) METHOD FOR CLOCK LINK AUTOMATIC PROTECTION IN PACKET TRANSPORT NETWORKS

(75) Inventor: Chuang Tang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 296 days.

(21) Appl. No.: 12/739,955

(22) PCT Filed: Dec. 28, 2007

(86) PCT No.: PCT/CN2007/003879
§ 371 (c)(1),
(2), (4) Date: Apr. 26, 2010

(87) PCT Pub. No.: WO2009/059475
PCT Pub. Date: May 14, 2009

(65) Prior Publication Data
US 2011/0051752 A1    Mar. 3, 2011

(30) Foreign Application Priority Data

Nov. 6, 2007    (CN) .......................... 2007 1 0176887

(51) Int. Cl.
*H04J 3/06*    (2006.01)
(52) U.S. Cl. ........................................ 370/503; 370/509
(58) Field of Classification Search .................. 370/503, 370/509, 512, 529, 513, 514
See application file for complete search history.

(56) References Cited

U.S. PATENT DOCUMENTS

| | | | |
|---|---|---|---|
| 2002/0059299 A1* | 5/2002 | Spaey ........................ | 707/104.1 |
| 2006/0083265 A1 | 4/2006 | Jordan et al. | |
| 2007/0060141 A1* | 3/2007 | Kangude et al. .............. | 455/445 |
| 2007/0113085 A1 | 5/2007 | Naslund et al. | |
| 2007/0150620 A1* | 6/2007 | Hand et al. ..................... | 709/248 |
| 2007/0168336 A1* | 7/2007 | Ransil et al. ...................... | 707/3 |
| 2008/0008138 A1* | 1/2008 | Pun ............................... | 370/338 |
| 2010/0125549 A1* | 5/2010 | Wang et al. ................... | 707/612 |
| 2011/0142078 A1* | 6/2011 | Wong et al. ................... | 370/503 |
| 2011/0158120 A1* | 6/2011 | Hamasaki et al. ............ | 370/252 |

FOREIGN PATENT DOCUMENTS

| | | |
|---|---|---|
| CN | 1352500 A | 6/2002 |
| CN | 1466394 A | 1/2004 |
| CN | 1921371 A | 2/2007 |
| WO | 2007030074 A1 | 3/2007 |

OTHER PUBLICATIONS

English Translation of the Written Opinion of the International Search Authority in international application No. PCT/CN2007/003879, mailed on Jul. 24, 2008.
International Search Report in international application No. PCT/CN2007/003879, mailed Jul. 24, 2008.

* cited by examiner

*Primary Examiner* — Andrew Lee
(74) *Attorney, Agent, or Firm* — Oppedahl Patent Law Firm LLC

(57) ABSTRACT

A method for clock link automatic protection in packet transport networks is disclosed. The method includes that: extending the clock synchronization status message to allow said clock synchronization status message to include: a clock identification (ID), a quality grade of clock, the number of network elements that the clock has passed, a clock alarm indication, and a forbidden-use indication; each network element in the clock link processes the clock synchronization status message; and said each network element selected a clock source according to the clock synchronization status message. The method in the present invention allows the network elements to be able to automatically select the optimal routing clock, forbid non-optimal routing clocks to participate in the selection, and effectively prevent the clocks from looping.

12 Claims, 2 Drawing Sheets

METHOD FOR CLOCK LINK AUTOMATIC PROTECTION IN PACKET TRANSPORT NETWORKS

TECHNICAL FIELD

The present invention relates to the fields of communications, and especially to a method for clock link automatic protection in packet transport networks.

BACKGROUND

The packet transport networks were originally used for data traffics without the synchronization requirement; as networks evolve, however, the packet transport networks have to transmit not only data traffics but also Time Division Multiplexing (TDM) traffics, therefore the synchronization issue has to be solved for the packet transport networks.

In its Recommendation G.8261/Y.1361, International Telecommunication Union-Telecom (ITU-T) has defined some concepts and network configuration methods related to clock synchronization in packet transport networks, and also proposed that clock Synchronization Status Messages (SSMs) are defined and used with reference to Recommendation ITU-T G.707. But, the descriptions about the SSM in Recommendation G.707 are relatively simple, and are not comprehensive enough for protecting the clock link in complex networking scenarios. Based on the recommendation, the method that can provide protection for the clock link is that: each network element selects an available clock source that has the highest quality grade as a current clock source; if the current clock source is the Primary Reference Clock (PRC), then the quality grade of the clock is transmitted along all line directions; if the current clock source is the line clock, then the quality grade sent back along the direction should not be used for synchronization, and the quality grade of the current line clock is transmitted along other directions.

In G.707, the contents in the definition of the SSM are quite simple so that in complex networking scenarios, the quality grade of line clocks extracted by some nodes are not optimal, such as the shortest clock path; there are multiple reference clocks in the network, and in case of the failure of one clock, a clock loop may be formed.

SUMMARY

The technical issue that the present invention intends to address is providing a method for clock link automatic protection in packet transport networks that allows the network element to be able to automatically select the optimal routing clock, forbid non-optimal routing clocks to participate in the selection, and effectively prevent the clocks from looping.

In order to address the above mentioned technical issue, the present invention provides a technical scheme as follows:

A method for clock link automatic protection in packet transport networks, which includes that:

the clock synchronization status message is extended to allow said clock synchronization status message to include: a clock identification, a clock quality grade, the number of network elements that the clock has passed, a clock alarm indication, and a forbidden-use indication;

each network element in the clock link processes the clock synchronization status message;

said each network element selects a clock source according to the clock synchronization status message.

The processing that said each network element makes on the clock synchronization status message includes: if the current clock of the network element originates from the Primary Reference Clock (PRC) and the PRC has not failed, then said network element transmits the clock identification and clock quality grade of the PRC along all line directions, and sets the number of network elements that the clock has passed to be 1; if the current clock of the network element originates from the PRC and the PRC has failed, then said network element converts the clock to a hold mode or an internal clock, keeps the clock identification unchanged, defines the clock quality grade as a synchronous equipment timing source signal, and sets the number of network elements that the clock has passed to be 1; if the current clock of the network element originates from a line clock and the line clock has not failed, then said network element sends back the quality grade that should not be used for synchronization along said line direction, transmits the clock identification and clock quality grade of the current line clock along other line directions, and sets the number of network elements that the clock has passed to be the received value plus 1; if the current clock of the network element originates from the line clock and the line clock has failed, then said network element converts the clock to the hold mode or the internal clock, keeps the clock identification unchanged, defines the clock quality grade as the synchronous equipment timing source signal, transmits clock alarm indications along other line directions, and sets the number of the network elements that the clock has passed to be the received value plus 1.

The clock source selection that said each network element makes according to the clock synchronization status message includes that: the clock source with the highest quality grade is selected from those clock sources without clock alarm indications.

The clock source selection that said each network element makes according to the clock synchronization status message further includes that: if there are multiple clock sources with the highest quality grade among those clock sources without clock alarm indications, then the clock source with the least number of the network elements that the clock has passed among said multiple clock sources should be selected.

The clock source selection that said each network element makes according to the clock synchronization status message further includes that: if there are multiple clock sources with the least number of the network elements that the clock has passed, then a clock source is randomly selected from said clock sources with the least number of network elements that the clock has passed.

After having selected a line clock, the network element will further mark the rest line clocks with the same clock identification as temporary forbidden-use, and such line clocks will not participate in clock selection.

If the current line clock of the network element has detected a clock alarm indication, then said network element will mark the line clock as usable, of which all clock identifications are as the same as the current line clock identification but being marked as temporary forbidden-use.

Said each network element processes the clock synchronization status message as operation, administration and maintenance (OAM) message.

Through the extended SSM, the present invention allows the network element to be able to receive more information about the clock link state and be able to choose the optimal clock route: that is with the highest quality grade and shortest path. At the same time, as long as the clock route exists, the network element will track the master clock rather than entering into other states, thus being able to effectively prevent the clocks from looping.

DETAILED DESCRIPTION

The present invention extends the SSM on the basis of G.8261/Y.1361 to allow the SSM to include such information as: a clock identification (ID), a clock quality grade, the number of network elements that the clock has passed, a clock alarm indication, and a forbidden-use indication. In packet transport networks, by transmitting the SSM, each network element automatically selects the optimal routing clock, forbids non-optimal routing clocks to participate in the selection, and can effectively prevent clocks from looping, thereby ensuring the synchronization performance of traffic transmission.

The packet transport networks are mainly based on packet switching, therefore the SSM will also need to be transmitted through packets. In the present invention, the packets containing the SSM can also be processed as OAM messages. For example, the SSM packet can be encoded in the format as shown in the following Table 1:

TABLE 1

| 8 7 6 5 4 3 2 1 |
| --- |
| Information header |
| Clock identification |
| Quality grade of clock |
| Number of network elements that the clock has passed |
| Clock alarm indication |
| Forbidden-use indication |
| Auxiliary information |
| Information end identification |

Wherein, the information header and the information end identification can use their respectively specified formats according to different technologies; if the Ethernet technology is used, then the information header includes a source address, a destination address and a protocol type, etc, while the information end identification is the Frame Check Sequence (FCS). The auxiliary information contains the version number of the SSM packet, thus making it easy for compatibility design.

The clock identification is used to identify the master clock, as there may be multiple same-grade PRCs existing in the network. The number of network elements that the clock has passed means the number of network elements that the master clock has passed until the master clock arriving at a certain network element node, as some phase noise will always be added whenever the clock passes a network element so that the quality of clock will somewhat reduce.

Here, encoding of the SSM is described for easier subsequent descriptions. In G.707, the SSM is encoded as follows:

| | |
| --- | --- |
| 2:0010 | G.811 clock signal |
| 4:0100 | G.812 clock signal of transfer nodes |
| 8:1000 | G.812 clock signal of local nodes |
| b:1011 | Synchronous Equipment Timing Source (SETS) signal |
| f:1111 | Should not be used for synchronization |

Figure 1:
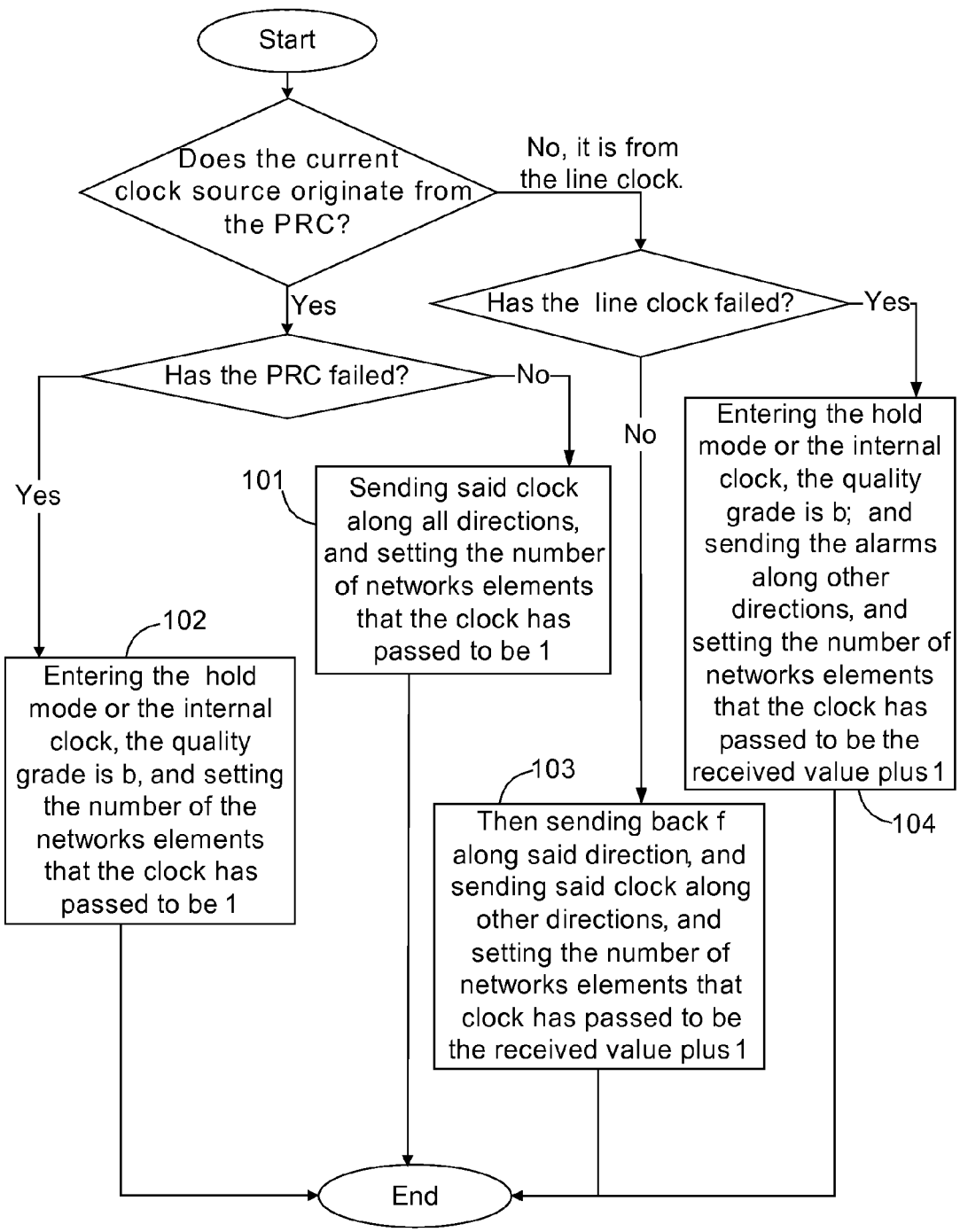
FIG. 1 is the processing flowchart of the SSM in the method of the exemplary embodiment of the present invention.

Please refer to FIG. 1, the processing flow of the SSM in the method of the exemplary embodiment of the present invention is listed as follows:

step 101: if the current clock of a network element originates from a PRC and the PRC has not failed, then said network element transmits a clock identification and a clock quality grade of the PRC along all line directions, and sets the number of network elements that the clock has passed to be 1;

step 102: if the current clock of the network element originates from PRC and PRC has failed, then said network element converts the clock to a hold mode or an internal clock, keeps the clock identification unchanged, defines the clock quality grade as b, and sets the number of network elements that the clock has passed to be 1;

step 103: if the current clock of the network element originates from the line clock and the line clock has not failed, then said network element sends back a quality grade f along said line direction, transmits the clock identification and the clock quality grade of the current line clock along other line directions, and sets the number of network elements that the clock has passed to be the received value plus 1; and step 104: if the current clock of the network element originates from the line clock and the line clock has failed, then said network element converts the clock to the hold mode or the internal clock, keeps the clock identification unchanged, defines the clock quality grade as b, transmits the clock alarm indication along other line directions, and sets the number of network elements that the clock has passed to be the received value plus 1.

On the basis of processing the SSM, each network element selects the clock source according to the SSM, and its selection rules are as follows:

(1) the clock source with the highest quality grade from those clock sources without clock alarm indications is selected;

(2) if there are multiple clock sources with the highest quality grade among those clock sources without clock alarm indications, then the clock source with the least number of network elements that the clock has passed among said multiple clock sources is selected; and (3) if there are multiple clock sources with said least number of network elements that the clock has passed, then a clock source from said clock sources with the least number of network elements that the clock has passed is selected randomly.

In the present invention, once having selected a line clock, the network element will further mark the rest line clocks with the same clock identification as temporary forbidden-use, and such line clocks will not participate in clock selection. If the current line clock of the network element has detected a clock alarm indication, then said network element will mark the line clocks as usable, of which all clock identifications are as the same as the current line clock identification but being marked as temporary forbidden-use.

Two specific examples that compare existing technologies and the method in the present invention are used below to further explain the technical scheme and advantages of the present invention.

Figure 2:
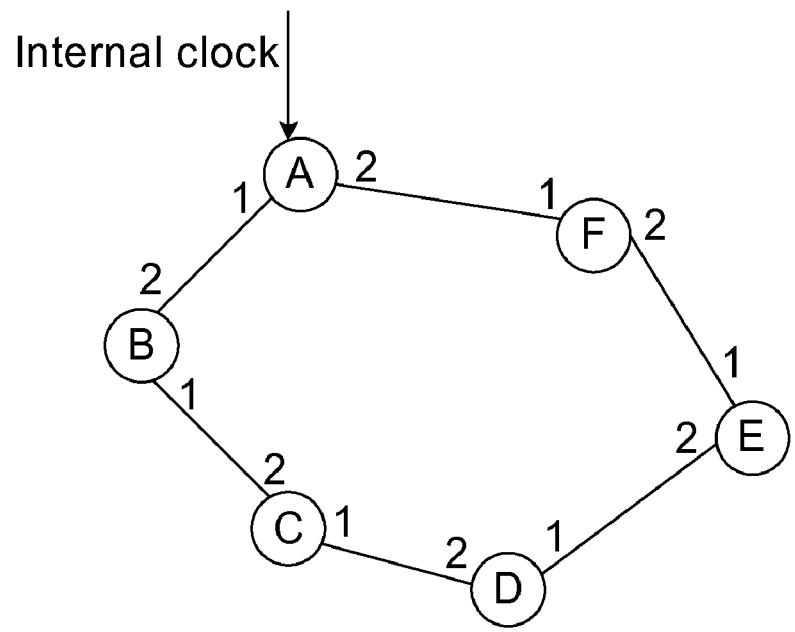
FIG. 2 is the diagram of a network topology structure applied in the method of the exemplary embodiment of the present invention.

Please refer to FIG. 2, which is the diagram of a network topology structure applied in the method of the exemplary embodiment of the present invention. In this diagram, the number (1, 2) beside each network element stands for the line direction of the connection between this network element and other network elements; if the SSM defined in G.707 is used, then the synchronization messages of each network element are shown in Table 2 as follows:

TABLE 2

|  | Network Element | | | | | |
|---|---|---|---|---|---|---|
|  | A | B | C | D | E | F |
| Current clock source | Internal clock | 2# | 2# | 2# | 1# | 1# |
| 1# sends synchronization messages | b | b | b | b | f | f |
| 1# receives synchronization messages | f | f | f | b | b | b |
| 2# sends synchronization messages | b | f | f | f | b | b |
| 2# receives synchronization messages | f | b | b | b | b | f |

If the 2# line clock of the B has failed, because the synchronization message along the 1# line direction of the point B is f, therefore point B enters the internal clock or the clock hold mode, at the grade of b; the synchronization message sent along the 1# direction is the same, i.e. still is b; other points are not affected. Thus, there are 2 independent equipment clocks A and B existing in the network, the clock link in the network is not protected, at which moment the synchronization messages are shown in Table 3 as follows:

TABLE 3

|  | Network Element | | | | | |
|---|---|---|---|---|---|---|
|  | A | B | C | D | E | F |
| Current clock source | Internal clock | Internal clock | 2# | 2# | 1# | 1# |
| 1# sends synchronization messages | Failed | b | b | b | f | f |
| 1# receives synchronization messages | Failed | f | f | b | b | b |
| 2# sends synchronization messages | b | Failed | f | f | b | b |
| 2# receives synchronization messages | f | Failed | b | b | b | f |

When the method of the present invention is used, the synchronization message is described according to the following format:

Clock identification-Clock quality grade-the number of network elements that the clock has passed-Clock alarm indication-Forbidden-use indication.

Under circumstances without failure, the synchronization messages of each network element are shown in Table 4 as follows:

TABLE 4

|  | Network Element | | | | | |
|---|---|---|---|---|---|---|
|  | A | B | C | D | E | F |
| Current clock source | Internal clock | 2# | 2# | 2# | 1# | 1# |
| 1# sends synchronization messages | X-b-1-0-0 | X-b-2-0-0 | X-b-3-0-0 | X-b-4-0-0 | X-f-0-0-0 | X-f-0-0-0 |
| 1# receives synchronization messages | X-f-0-0-0 | X-f-0-0-0 | X-f-0-0-0 | X-b-3-0-1 | X-b-2-0-0 | X-b-1-0-0 |
| 2# sends synchronization messages | X-b-1-0-0 | X-f-0-0-0 | X-f-0-0-0 | X-f-0-0-0 | X-b-3-0-0 | X-b-2-0-0 |
| 2# receives synchronization messages | X-f-0-0-0 | X-b-1-0-0 | X-b-2-0-0 | X-b-3-0-0 | X-b-4-0-1 | X-f-0-0-0 |

TABLE 5

|  | Network Element | | | | | |
|---|---|---|---|---|---|---|
|  | A | B | C | D | E | F |
| Current clock source | Internal clock | Internal clock | 2# | 2# | 1# | 1# |
| 1# sends synchronization messages | Failed | X-b-1-1-0 | X-b-2-1-0 | X-b-3-1-0 | X-f-0-0-0 | X-f-0-0-0 |
| 1# receives synchronization messages | Failed | X-f-0-0-0 | X-f-0-0-0 | X-b-3-0-1 | X-b-2-0-0 | X-b-1-0-0 |
| 2# sends synchronization messages | X-b-1-0-0 | Failed | X-f-0-0-0 | X-f-0-0-0 | X-b-3-0-0 | X-b-2-0-0 |
| 2# receives synchronization messages | X-f-0-0-0 | Failed | X-b-1-1-0 | X-b-2-1-0 | X-b-4-0-1 | X-f-0-0-0 |

If the 2# line clock of the network element B has failed, then the point B will enter the internal clock or the hold mode, but the clock alarm indication will be inserted into the sent message, as shown in Table 5 below:

When the 2# of the point D receives the clock alarm indication, the forbidden-use indication of the 1# is turned off (i.e. the clock along the 1# direction is available), the point D activates switching to switch over to the 1# direction and at the same time sends the synchronization message x-b-4-0-0 to the 2#, then the point C receives the synchronization message of the 1# direction, and the quality grade is b, and the number of nodes that the clock has passed is 4 but without any clock alarm indication, so the point C switches over to the 1# direction, and likewise, the point B also switches over to the 1# direction, so as to accomplish protection of the clock link, and the clock synchronization messages after the protection switching are shown in Table 6 as follows:

TABLE 6

| | Network Element | | | | | |
|---|---|---|---|---|---|---|
| | A | B | C | D | E | F |
| Current clock source | Internal clock | 1# | 1# | 1# | 1# | 1# |
| 1# sends synchronization messages | Failed | X-f-0-0-0 | X-f-0-0-0 | X-f-0-0-0 | X-f-0-0-0 | X-f-0-0-0 |
| 1# receives synchronization messages | Failed | X-b-5-0-0 | X-b-4-0-0 | X-b-3-0-0 | X-b-2-0-0 | X-b-1-0-0 |
| 2# sends synchronization messages | X-b-1-0-0 | Failed | X-b-5-0-0 | X-b-4-0-0 | X-b-3-0-0 | X-b-2-0-0 |
| 2# receives synchronization messages | X-f-0-0-0 | Failed | X-f-0-0-0 | X-f-0-0-0 | X-f-0-0-0 | X-f-0-0-0 |

In this example, if the SSM specified in G.707 is used, and the clock is not protected, primarily because when the line clock fails, the directly affected network element has entered the equipment clock, by which the synchronization message sent can not be distinguished from the message sent by the master clock; while the present invention can be used to prevent such phenomenon and accomplish protection of the clock link.

Figure 3:
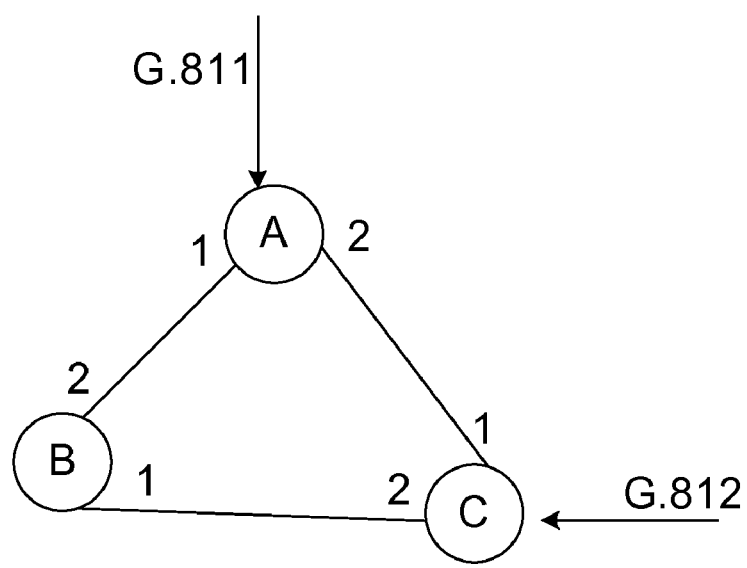
FIG. 3 is the diagram of another network topology structure applied in the method of the exemplary embodiment of the present invention.

Please refer to FIG. 3, which is the diagram of another network topology structure applied in the method of the exemplary embodiment of the present invention. If there are multiple reference clocks in the network, then the clock with the highest quality grade should be tracked on a network-wide; when the clock with the highest quality grade fails, the reference clock with the secondary highest quality grade will be tracked on a network-wide. If the SSM defined in G.707 is used, then the synchronization messages of each network element are shown in Table 7 as follows:

TABLE 7

| Network Element | A | B | C |
|---|---|---|---|
| Current clock source | G.811 | 2# | 1# |
| 1# sends synchronization messages | 2 | 2 | f |
| 1# receives synchronization messages | f | 2 | 2 |
| 2# sends synchronization messages | 2 | f | 2 |
| 2# receives synchronization messages | f | 2 | 2 |

When the G.811 fails, since both the 1# and 2# line directions of the point A are f, the point A enters the clock hold mode or the internal clock, and the clock grade along the 1# and 2# sending directions is b; on the other hand, since the time delay of the SSM being transmitted over the network is indeed different, for the point C, the sequence in which the synchronization message along the two line directions changes from 2 to b is different and unpredictable, assuming that the 1# direction changes to b first, the 2# direction still stays as 2, and the grade is still higher than the G.812, then the point C will activate switching, the clock along the 2# direction will be tracked, and the synchronization message sent by the point C will be that the 2# sends f and the 1# sends 2.

The 2# direction of the point A receives 2, then the point A activates switching to switch over from the equipment clock to the line clock of the 2# direction, the 2# direction sends back f, and the 1# direction sends 2; the point B receives 2 from the 2# direction and activates switching to switch over to the line clock of the 2# direction, the 2# direction sends back f, and the 1# direction sends 2.

In this way, the network-wide clock switching ends, the network enters the stable state, at which moment all network elements will track the 2# direction, a clock loop is formed, and does not switch over to the G.812, and the synchronization messages are shown in Table 8 as follows:

TABLE 8

| Network Element | A | B | C |
|---|---|---|---|
| Current clock source | 2# | 2# | 2# |
| 1# sends synchronization messages | 2 | 2 | 2 |
| 1# receives synchronization messages | f | f | f |
| 2# sends synchronization messages | f | f | f |
| 2# receives synchronization messages | 2 | 2 | 2 |

If the present invention is used, then under normal circumstances, the synchronization messages of each network element are shown in Table 9 as follows:

TABLE 9

| Network Element | A | B | C |
|---|---|---|---|
| Current clock source | G.811 | 2# | 1# |
| 1# sends synchronization messages | X-2-1-0-0 | X-2-2-0-0 | X-f-0-0-0 |
| 1# receives synchronization messages | X-f-0-0-0 | X-2-2-0-1 | X-2-1-0-0 |
| 2# sends synchronization messages | X-2-1-0-0 | X-f-0-0-0 | X-2-2-0-0 |
| 2# receives synchronization messages | X-f-0-0-0 | X-2-1-0-0 | X-2-2-0-1 |

Wherein, the points B and C will track a clock based on the principle of the highest priority and the shortest route of the clock; at the same time, the B and C will be the demarcation point of the clock transmission link, therefore it is required to process the line forbidden-use identification, i.e. the clock transmitted by the stand-by route is temporarily set as forbidden-use. If the G.811 clock of the point A fails, the quality of both the 1# and 2# lines of the point A will be f and unusable, and the point A will enter the clock hold mode or the internal clock state, and the quality sent by the 1# and the 2# is b.

For the point B, when the quality grade received from the 2# direction changes to b first, the 1# direction has the forbidden-use indication, so the clock source of the point B will still stay along the 2# line direction and unchanged, and the synchronization message sent along the 1# direction changes to X-b-2-0-0.

For the point C, when the quality grade received from the 1# direction changes to b first, the 2# direction has the forbidden-use indication, so its clock quality grade also changes to b, at which moment the point C activates cock source switching to switch over to the G.812 clock, and the synchronization message sent along the 1# and 2# directions changes to Y-4-1-0-0.

For both the points A and B, because the line synchronization message received has changed to Y-4-1-0-0, the clock sources of the A and B will switch over respectively, the A and B will become the clock demarcation point of which clock identification is Y, and the forbidden-use identification will be processed. The synchronization messages of each point after the switching are shown in Table 10 as follows:

TABLE 10

| Network Element | A | B | C |
|---|---|---|---|
| Current clock source | 2# | 1# | G.812 |
| 1# sends synchronization messages | Y-4-2-0-0 | Y-f-0-0-0 | Y-4-1-0-0 |
| 1# receives synchronization messages | Y-4-2-0-1 | Y-4-1-0-0 | Y-f-0-0-0 |
| 2# sends synchronization messages | Y-f-0-0-0 | Y-4-2-0-0 | Y-4-1-0-0 |
| 2# receives synchronization messages | Y-4-1-0-0 | Y-4-2-0-1 | Y-f-0-0-0 |

In this example, if the SSM specified in G.707 is used, the clock is not protected; while the present invention can be used to prevent such phenomenon and accomplish protection of the clock link.

Finally, it should be noted that the above mentioned embodiment is only used to explain rather than restrict the technical scheme of the present invention; For those skilled in the art, various modifications and changes can be made to the present invention. Any modification, equivalent substitute and improvement within the spirit of the present invention is deemed to be included within the scope of the present invention, as defined by the claims.

The invention claimed is:

1. A method for clock link automatic protection in packet transport networks, including:
Extending a clock synchronization status message to allow said clock synchronization status message to include: a clock identification ID, a clock quality grade, the number of network elements that the clock has passed, a clock alarm indication, and a forbidden-use indication;
each network element in the clock link processing the clock synchronization status message; and
said each network element selecting a clock source according to the clock synchronization status message.

2. The method according to claim 1, wherein, the processing that said each network element makes on the clock synchronization status message includes:
if the current clock of the network element originates from the Primary Reference Clock (PRC) and the PRC has not failed, then said network element transmit the clock identification and the clock quality grade of said PRC along all line directions, and sets the number of network elements that the clock has passed to be 1;
if the current clock of the network element originates from the PRC and the PRC has failed, then said network element converts the clock to a hold mode or an internal clock, keeps the clock identification unchanged, defines the clock quality grade as a synchronous equipment timing source signal, and sets the number of network elements that the clock has passed to be 1;
if the current clock of the network element originates from the line clock and the line clock has not failed, then said network element sends back quality grade that should not be used for synchronization along said line direction, transmits the clock identification and the clock quality grade of the current line clock along other line directions, and sets the number of network elements that the clock has passed to be the received value plus 1; and
if the current clock of the network element originates from the line clock and the line clock has failed, then said network element converts the clock to the hold mode or the internal clock, keeps the clock identification unchanged, defines the clock quality grade as the synchronous equipment timing source signal, transmits the clock alarm indication along other line directions, and sets the number of network elements that the clock has passed to be the received value plus 1.

3. The method according to claim 2, wherein, the clock source selection that said each network element making according to the clock synchronization status message includes that:
the clock source with the highest quality grade is selected from those clock sources without clock alarm indications.

4. The method according to claim 3, wherein, the clock source selection that said each network element making according to the clock synchronization status message further includes that:
if there are multiple clock sources with the highest quality grade among those clock sources without clock alarm indications, then the clock source with the least number of the network elements that the clock has passed among said multiple clock sources is selected.

5. The method according to claim 4, wherein, the clock source selection that said each network element making according to the clock synchronization status message further includes that:
if there are multiple clock sources with the least number of the network elements that the clock has passed, then a clock source is randomly selected from said clock sources with the least number of the network elements that the clock has passed.

6. The method according to claim 3, wherein:
After having selected a line clock, the network element will further mark the rest line clocks with the same clock identification as temporary forbidden-use, and such line clocks will not participate in clock selection.

7. The method according to claim 6, wherein:
if the current line clock of the network element has detected a clock alarm indication, then said network element will mark the line clock as usable, of which all clock identifications are as the same as the current line clock identification but being marked as temporary forbidden-use.

8. The method according to claim 1, wherein:
said each network element processes the clock synchronization status message as operation, administration and maintenance (OAM) message.

9. The method according to claim 4, wherein:
After having selected a line clock, the network element will further mark the rest line clocks with the same clock identification as temporary forbidden-use, and such line clocks will not participate in clock selection.

10. The method according to claim 5, wherein:
After having selected a line clock, the network element will further mark the rest line clocks with the same clock identification as temporary forbidden-use, and such line clocks will not participate in clock selection.

11. The method according to claim 9, wherein:
if the current line clock of the network element has detected a clock alarm indication, then said network element will mark the line clock as usable, of which all clock identifications are as the same as the current line clock identification but being marked as temporary forbidden-use.

12. The method according to claim 10, wherein:
if the current line clock of the network element has detected a clock alarm indication, then said network element will mark the line clock as usable, of which all clock identifications are as the same as the current line clock identification but being marked as temporary forbidden-use.

* * * * *